United States Patent
Tomii

(10) Patent No.: US 10,389,888 B2
(45) Date of Patent: Aug. 20, 2019

(54) IMAGE FORMING APPARATUS AND METHOD OF CONTROLLING AN IMAGE FORMING APPARATUS

(71) Applicant: CANON KABUSHIKI KAISHA, Tokyo (JP)

(72) Inventor: Hiroshi Tomii, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/923,793

(22) Filed: Mar. 16, 2018

(65) Prior Publication Data

US 2018/0288236 A1 Oct. 4, 2018

(30) Foreign Application Priority Data

Mar. 28, 2017 (JP) ................. 2017-062687
Mar. 8, 2018 (JP) ................. 2018-041733

(51) Int. Cl.
*H04N 1/00* (2006.01)
*H04N 1/60* (2006.01)

(52) U.S. Cl.
CPC ..... *H04N 1/00031* (2013.01); *H04N 1/00023* (2013.01); *H04N 1/00045* (2013.01); *H04N 1/6033* (2013.01)

(58) Field of Classification Search
CPC .......... H04N 1/00023; H04N 1/00026; H04N 1/00031; H04N 1/00034; H04N 1/00045; H04N 1/00063; H04N 1/00177; H04N 1/6041; H04N 1/6033
See application file for complete search history.

(56) References Cited

FOREIGN PATENT DOCUMENTS

| JP | 2009-192896 | 8/2009 |
|----|-------------|--------|
| JP | 2013-044990 | 3/2013 |

*Primary Examiner* — Nicholas Pachol
(74) *Attorney, Agent, or Firm* — Venable LLP

(57) ABSTRACT

An image forming apparatus includes an image forming portion configured to form an image on an intermediate transfer belt, a density sensor configured to measure a density of the image formed on the intermediate transfer belt, and a printer controller. On the intermediate transfer belt, a first test image and a third test image having different densities are alternately formed at different positions in a main scanning direction. At a position adjacent to the first test image in a sub-scanning direction, a second test image having a different density from that of the first test image is formed. At a position adjacent to the third test image in the sub-scanning direction, a fourth test image having a different density from that of the third test image is formed. The printer controller generates a gradation correction table based on a result of measurement of each test image by the density sensor.

20 Claims, 12 Drawing Sheets

| ● | : ACTUALLY MEASURED VALUE |
| ○ | : INTERPOLATION VALUE FROM DENSITY UNEVENNESS IN MAIN SCANNING DIRECTION |
| — | : NO CORRECTION DATA |

| CORRECTION DATA FROM TEST IMAGE IN RELATED ART | | | | | | | |
|---|---|---|---|---|---|---|---|
| | | MAIN SCANNING POSITION X | | | | | |
| | | G 1 | G 2 | G 3 | G 4 | G 5 | G 6 |
| DENSITY SIGNAL VALUE I | L 9 | ● | ● | ● | ● | ● | ● |
| | L 8 | — | — | — | — | — | — |
| | L 7 | ● | ● | ● | ● | ● | ● |
| | L 6 | — | — | — | — | — | — |
| | L 5 | ● | ● | ● | ● | ● | ● |
| | L 4 | — | — | — | — | — | — |
| | L 3 | ● | ● | ● | ● | ● | ● |
| | L 2 | — | — | — | — | — | — |
| | L 1 | — | — | — | — | — | — |
| | L 0 | ● | ● | ● | ● | ● | ● |

| CORRECTION DATA FROM TEST IMAGE IN FIRST EMBODIMENT | | | | | | | |
|---|---|---|---|---|---|---|---|
| | | MAIN SCANNING POSITION X | | | | | |
| | | G 1 | G 2 | G 3 | G 4 | G 5 | G 6 |
| DENSITY SIGNAL VALUE I | L 9 | ● | ○ | ● | ○ | ● | ○ |
| | L 8 | ○ | ● | ○ | ● | ○ | ● |
| | L 7 | ● | ○ | ● | ○ | ● | ○ |
| | L 6 | ○ | ● | ○ | ● | ○ | ● |
| | L 5 | ● | ○ | ● | ○ | ● | ○ |
| | L 4 | ○ | ● | ○ | ● | ○ | ● |
| | L 3 | ● | ○ | ● | ○ | ● | ○ |
| | L 2 | ○ | ● | ○ | ● | ○ | ● |
| | L 1 | ○ | ● | ○ | ● | ○ | ● |
| | L 0 | ● | ○ | ● | ○ | ● | ○ |

FIG. 8

025# IMAGE FORMING APPARATUS AND METHOD OF CONTROLLING AN IMAGE FORMING APPARATUS

BACKGROUND OF THE INVENTION

Field of the Invention

The present invention relates to density control of an image formed by an image forming apparatus.

Description of the Related Art

An electrophotographic image forming apparatus forms an image by scanning a photosensitive member with laser light. The image forming apparatus includes an exposing device configured to emit laser light. The exposing device irradiates the photosensitive member having a uniformly charged surface with the laser light in accordance with an image signal representing an image to be formed. With the irradiation of the laser light, an electrostatic latent image is formed on the photosensitive member. The electrostatic latent image is developed using toner, and thus a toner image is formed on the photosensitive member. The toner image is transferred onto a sheet. The image forming apparatus includes a fixing device. The fixing device heats and pressurizes the sheet having the toner image transferred thereon to fix the toner image onto the sheet. In this manner, an image is formed on the sheet.

In the image forming apparatus, the formed image sometimes has change in color tones due to environmental change of, for example, temperature and humidity, temporal change of the apparatus, performance deterioration of components, or other reasons. In order to suppress the change in color tones to form an image having a stable image quality, the image forming apparatus performs density gradation correction. The density gradation correction is generally performed by forming, onto a sheet, a measuring image including a color test image for measuring the gradation. The image forming apparatus performs the density gradation correction by generating a correction table based on a result of the measurement of the color test image, which is performed by a densitometer or a colorimeter, and on target data set in advance, and correcting the image signal based on the correction table.

In order to perform the density gradation correction at high accuracy, when the correction table is generated, it is required to consider the influence of density unevenness and color unevenness in the measuring image. The influence of the unevenness is generally larger in a main scanning direction in which the laser light scans the photosensitive member, than in a sub-scanning direction. Some of the density unevenness in the main scanning direction is caused by unevenness in laser light amount, for example, aberration of a lens forming an optical system configured to guide the laser light to the photosensitive member, lens distortion, inclination of a position at which the exposing device is mounted, and change in laser optical path length. Further, some of the density unevenness in the main scanning direction is caused by sensitivity unevenness of the photosensitive member and charging unevenness of the photosensitive member.

In order to reduce the density unevenness, density unevenness correction in the main scanning direction is performed. The density unevenness correction in the main scanning direction is performed by using a sheet in which an image forming range in the main scanning direction is divided into a plurality of blocks, and a measuring image including a reference test image for measuring the density unevenness is formed on each of those blocks. The laser light amount is adjusted based on results of measurement of the reference test images of the respective blocks so that the difference in density among the respective blocks is eliminated.

In general, after the density unevenness correction in the main scanning direction is performed, the density gradation correction is performed by using a similar procedure. The density unevenness correction and the density gradation correction are performed using different measuring images. Therefore, a user is required to perform each of work of printing the measuring image and work of measuring the measuring image two times for the density unevenness correction and the density gradation correction. This causes reduction in user's convenience.

Further, when the measuring image for the density unevenness correction and the measuring image for the density gradation correction are separately printed, printing conditions of the image forming apparatus vary. Therefore, the result of the density unevenness correction cannot be accurately reflected on the density gradation correction, and hence the accuracy of the density gradation correction is reduced.

In view of this, there has been proposed a method involving forming a measuring image including the reference test image for the density unevenness correction and a color test image for the density gradation correction onto one sheet, to thereby simultaneously perform the density unevenness correction in the main scanning direction and the density gradation correction. In Japanese Patent Application Laid-open No. 2009-192896, there is described an image forming apparatus configured to print a measuring image in which a plurality of color test images and a plurality of reference test images are arranged on the same main scanning line, to thereby measure the density of the printed measuring image. This image forming apparatus performs the density unevenness correction in the main scanning direction using the measured densities of the plurality of reference test images, and performs the density gradation correction using the measured densities of the plurality of color test images. In Japanese Patent Application Laid-open No. 2013-44990, there is described an image forming apparatus configured to generate a gradation correction table corresponding to each position in the main scanning direction and the sub-scanning direction, to thereby correct the density unevenness in the entire gradation range.

The density unevenness in the main scanning direction is caused by many reasons, and the degree of influence differs depending on a density range. Therefore, the image forming apparatus of Japanese Patent Application Laid-open No. 2009-192896 can correct the density unevenness in a density range of the reference test images for the density unevenness correction in the main scanning direction, but cannot accurately correct the density unevenness in a density range in which the reference test image is not formed. The image forming apparatus of Japanese Patent Application Laid-open No. 2013-44990 obtains a correction value of each density based on the reference test images whose densities are changed stepwise, and thus can correct the density unevenness in each density level. However, the number of reference test images to be used for correction is increased, and hence the measuring image is required to be printed on a plurality of sheets, leading to reduction in user's convenience. Further, the measuring image is dividedly printed on a plurality of sheets, and hence an accuracy of generating the gradation correction table is reduced depending on the accuracy of the printing condition of the image forming apparatus during printing. The present invention provides an image forming apparatus capable of correcting the gradation at high accuracy while maintaining the user's convenience.

SUMMARY OF THE INVENTION

The image forming apparatus according to the present disclosure includes: a photosensitive member configured to rotate; a converting unit configured to convert image data based on a plurality of conversion conditions corresponding to a plurality of positions in a predetermined direction orthogonal to a rotation direction of the photosensitive member; an exposing unit configured to expose the photosensitive member with light based on the image data converted by the converting unit to form an electrostatic latent image on the photosensitive member; a developing unit configured to develop the electrostatic latent image formed on the photosensitive member to form an image; and a controller configured to: control the photosensitive member, the exposing unit, and the developing unit to form a first test image and a second test image in a first region including a first position among the plurality of positions; control the photosensitive member, the exposing unit, and the developing unit to form a third test image and a fourth test image in a second region including a second position among the plurality of positions, the second region being different from the first region in the predetermined direction; control the photosensitive member, the exposing unit, and the developing unit to form a different first test image and a different second test image in a third region including a third position among the plurality of positions, the third region being different from the first region and the second region in the predetermined direction; control the photosensitive member, the exposing unit, and the developing unit to form a different third test image and a different fourth test image in a fourth region including a fourth position among the plurality of positions, the fourth region being different from the first region, the second region, and the third region in the predetermined direction; acquire measurement data related to a plurality of test images, wherein the measurement data is output from a sensor, wherein the plurality of test images include the first test image, the second test image, the third test image, the fourth test image, the different first test image, the different second test image, the different third test image, and the different fourth test image; and generate the plurality of conversion conditions based on the measurement data, wherein the third test image, the different third test image, the fourth test image, and the different fourth test image are prevented from being formed in the first region, wherein the first test image, the different first test image, the second test image, and the different second test image are prevented from being formed in the second region, wherein the third test image, the different third test image, the fourth test image, and the different fourth test image are prevented from being formed in the third region, and wherein the first test image, the different first test image, the second test image, and the different second test image are prevented from being formed in the fourth region.

Further features of the present invention will become apparent from the following description of exemplary embodiments (with reference to the attached drawings).

BRIEF DESCRIPTION OF THE DRAWINGS

FIG. 8 is an explanatory diagram of the correction data.

DESCRIPTION OF THE EMBODIMENTS

One embodiment of the present invention is described below with reference to the accompanying drawings.

First Embodiment

Figures 1, 2:
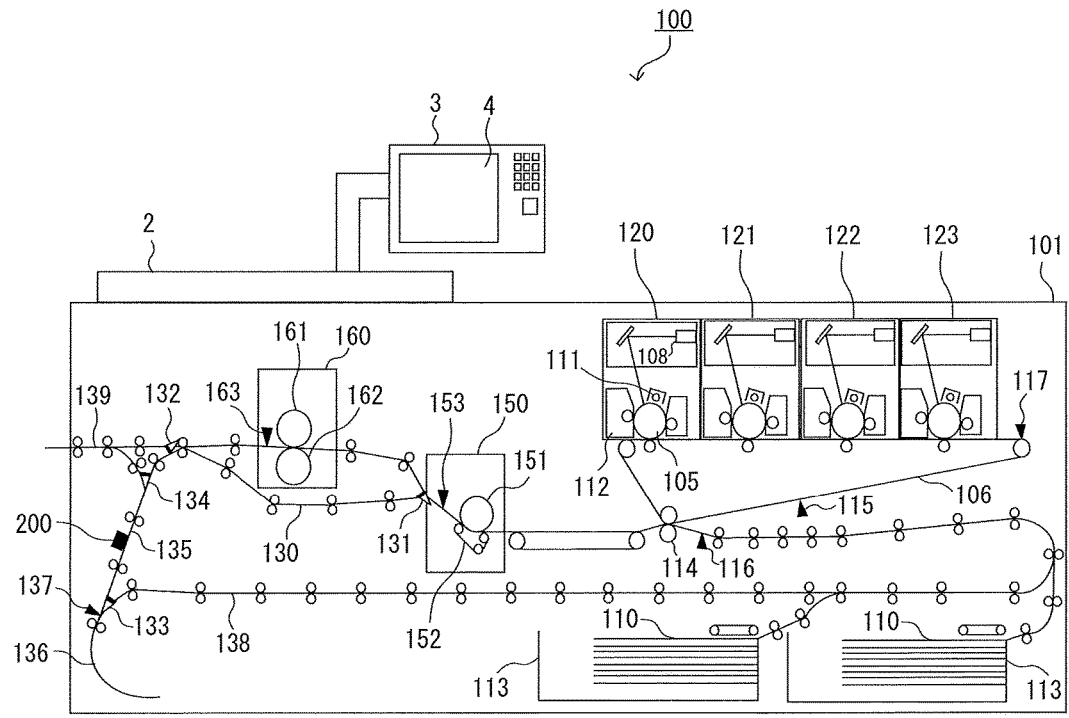
FIG. 1 is a configuration diagram of an image forming apparatus.
FIG. 2 is an explanatory diagram of a printer controller.

FIG. 1 is a configuration diagram of an image forming apparatus 100. The image forming apparatus 100 includes a printer 101, an image reading portion 2, a console unit 3 and a display portion 4 for displaying information.

The printer 101 includes four image forming portions 120, 121, 122, and 123 configured to form images of respective color components. The image forming portion 120 forms a yellow image. The image forming portion 121 forms a magenta image. The image forming portion 122 forms a cyan image. The image forming portion 123 forms a black image.

The respective image forming portions 120, 121, 122, and 123 have the same configuration. Now, the configuration of the image forming portion 120 configured to form a yellow image is described. Description of configurations of other image forming portions 121, 122, and 123 is omitted. A photosensitive drum 105 is a photosensitive member including a photosensitive layer at its surface, and is charged by a charging device 111 while being rotated. The photosensitive drum 105 is scanned with laser emitted from an exposing device 108 controlled based on image data. With the scanning of the laser light, an electrostatic latent image is formed on the photosensitive drum 105. A developing device 112 develops the electrostatic latent image using a developer containing toner and magnetic carriers. In this manner, a toner image is formed on the surface of the photosensitive drum 105. The toner image formed on the photosensitive drum 105 is transferred onto an intermediate transfer belt 106 serving as an intermediate transfer member.

The charging device 111 functions as a charging unit configured to charge the photosensitive drum 105. The exposing device 108 functions as an exposing unit configured to expose the photosensitive drum 105 with light based on the image data for forming the electrostatic latent image on the photosensitive drum 105. The developing device 112 functions as a developing unit configured to develop the electrostatic latent image formed on the photosensitive drum 105 using toner.

A sheet 110 received in a container 113 is conveyed toward transfer rollers 114 so as to reach the transfer rollers 114 at the time when the toner image borne on the intermediate transfer belt 106 reaches the transfer rollers 114. The transfer rollers 114 transfer the toner image borne on the intermediate transfer belt 106 onto the sheet 110. The transfer rollers 114 function as a transfer unit configured to transfer the toner image formed on the photosensitive drum 105 onto the sheet 110. Alternatively, the transfer rollers 114 function as a transfer unit configured to transfer the toner image transferred on the intermediate transfer belt 106 onto the sheet 110. The sheet 110 having the toner image transferred thereon is conveyed to fixing devices 150 and 160.

The fixing devices 150 and 160 heat and pressurize the toner image transferred on the sheet 110 to fix the toner image onto the sheet 110. The fixing device 150 includes a fixing roller 151, a pressure belt 152, and a sensor 153. The fixing roller 151 includes a heater configured to heat the sheet 110. The pressure belt 152 brings the sheet 110 into pressure-contact with the fixing roller 151. The sensor 153 detects passage of the sheet 110 over a fixing position of the fixing device 150. The fixing device 160 is arranged on the downstream of the fixing device 150 in a conveyance direction of the sheet 110. The fixing device 160 applies gloss to the toner image formed on the sheet 110 that has passed through the fixing device 150. The fixing device 160 includes a fixing roller 161 including a heater, a pressure roller 162, and a sensor 163 configured to detect passage of the sheet 110 over a fixing position of the fixing device 160.

When an image is fixed onto the sheet 110 in a mode of applying gloss, or when an image is fixed onto thick paper, the printer 101 conveys the sheet 110 that has passed through the fixing device 150 to the fixing device 160. When an image is fixed onto plain paper or thin paper, the printer 101 conveys the sheet 110 that has passed through the fixing device 150 along a conveyance path 130 that bypasses the fixing device 160. In this manner, the sheet 110, which is thin paper or the like, is delivered out from the printer 101 without being conveyed to the fixing device 160.

Whether to convey the sheet 110 to the fixing device 160 or to convey the sheet 110 while bypassing the fixing device 160 is controlled through switching of a flapper 131.

A flapper 132 is a guiding member configured to guide the sheet 110 to any one of a conveyance path 135 and a conveyance path 139 connected to the outside. The sheet 110 conveyed along the conveyance path 135 is conveyed to a reversing portion 136. When a reversing sensor 137 provided on the conveyance path 135 detects a trailing edge of the sheet 110, the conveyance direction of the sheet 110 is reversed.

A flapper 133 is a guiding member configured to guide the sheet 110 to any one of a conveyance path 138 for duplex image formation and a conveyance path 135. The sheet 110 conveyed along the conveyance path 138 is conveyed to the transfer rollers 114 again. When a duplex printing mode is executed, after an image is fixed onto a first surface of the sheet 110, the sheet 110 is switched back in the conveyance path 136, and is conveyed to the transfer rollers 114 along the conveyance path 138. Then, an image is formed on a second surface of the sheet 110.

On the conveyance path 135, a color sensor 200 configured to measure a density of a measuring image formed on the sheet 110 is arranged. When the image forming apparatus 100 receives an instruction to execute density stabilizing control from the console unit 3 or an external computer, the image forming apparatus 100 executes maximum density adjustment control and gradation adjustment control using the color sensor 200.

A flapper 134 is a guiding member configured to guide the sheet 110 to the conveyance path 139. For example, when the sheet 110 is delivered with its face down, the flapper 134 guides the sheet that has been switched back at the reversing portion 136 to the conveyance path 139. The sheet 110 conveyed along the conveyance path 139 is delivered to the outside of the printer 101.

Around the intermediate transfer belt 106, a density sensor 117, a position detection sensor 115, and a position detection sensor 116 are provided. The density sensor 117 measures a test image formed on the intermediate transfer belt 106. Six density sensors 117 are provided along a direction orthogonal to a direction in which the intermediate transfer belt 106 conveys the image. The density sensor 117 may be an area sensor, for example, a contact image sensor (CIS). The position detection sensor 115 detects whether or not the image formed on the intermediate transfer belt 106 has passed over a predetermined position. The position detection sensor 116 detects whether or not the sheet 110 has reached a standby position.

FIG. 2 is an explanatory diagram of a printer controller 10 configured to control the image forming apparatus 100. A control unit 11 is formed of a central processing unit (CPU), a random access memory (RAM), and other units. The control unit 11 reads out and executes a computer program stored in a storage unit 12, to thereby control an operation of each unit of the image forming apparatus 100. For example, the control unit 11 controls an image forming operation to be performed by the printer 101. An image forming portion 5 corresponds to the above-mentioned image forming portions 120, 121, 122, and 123.

The storage unit 12 stores, for example, various computer programs and parameters to be used for execution of processing. A memory control unit 13 controls input/output of image data to/from an image memory 14. The image memory 14 is a temporary memory for image storage, and is formed of, for example, a dynamic RAM (DRAM).

Figure 3:
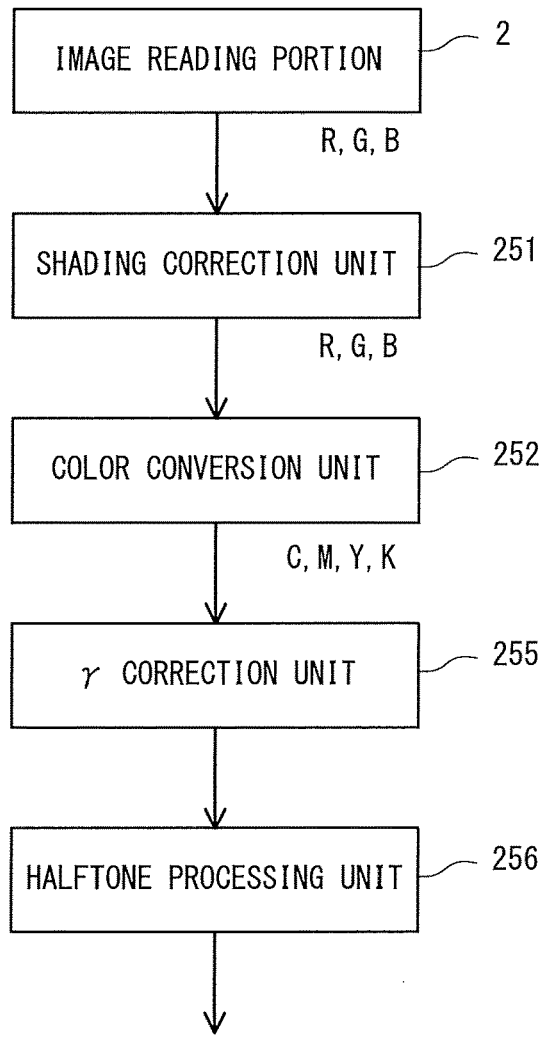
FIG. 3 is an explanatory diagram of functions of an image processing unit.

FIG. 3 is an explanatory diagram of main functions of an image processing unit 15. The image processing unit 15 performs image processing on image data (digital image signal).

A shading correction unit 251 corrects a reading error of the image reading portion 2 for digital image signals of red (R), green (G), and blue (B) transmitted from the image reading portion 2. A color conversion unit 252 performs color conversion on the digital image signal subjected to shading correction. The color conversion unit 252 converts the digital image signals of red (R), green (G), and blue (B) into image signals of yellow (Y), magenta (M), cyan (C), and black (K). The generated image signals of the respective colors of Y, M, C, and K are transmitted to a γ correction unit 255 for each color. The γ correction unit 255 converts the image signals based on a conversion condition so that the gradation characteristic of the printer 101 becomes an ideal gradation characteristic. The γ correction unit 255 converts the image signals with use of, as the conversion condition, a gradation correction table representing a correspondence relationship between an input value and an output value of the image signal. A halftone processing unit 256 performs pseudo-halftone processing on the image signal output from the γ correction unit 255. The halftone processing is performed by methods such as a dither matrix method and an error diffusion method. The halftone processing unit 256 transmits the image signal to the exposing device 108. The exposing device 108 controls the on/off of the laser light based on the image signal.

<Processing of generating Gradation Correction Table>

Figure 4:
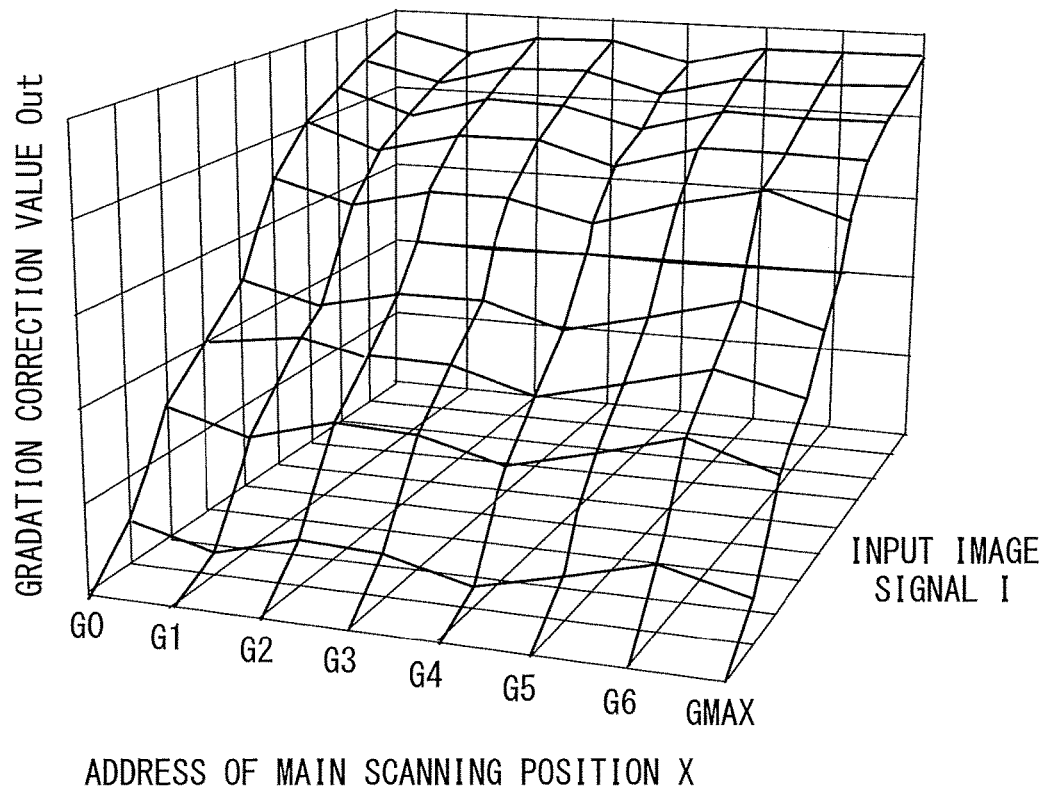
FIG. 4 is an explanatory diagram of gradation correction values with respect to input signals at main scanning positions.

Description is given of a method of generating a gradation correction table for each main scanning position using a test image that is a measuring image for generating the gradation correction table. The gradation correction table corresponding to each main scanning position generated here is, as shown in FIG. 4, a table representing a relationship of a gradation correction value Out with respect to an address of a main scanning position X and an input image signal I. The main scanning position corresponds to a position in a predetermined direction (main scanning direction) in which the laser light emitted from the exposing device 108 scans the photosensitive drum 105. In other words, a direction orthogonal to a rotation direction of the photosensitive drum 105 corresponds to the predetermined direction (main scanning direction). In the following, a direction orthogonal to the main scanning direction is referred to as "sub-scanning direction". The main scanning positions are divided into, for example, eight regions as shown in FIG. 4. A region extending from one end portion of the photosensitive drum 105 by a predetermined length in the main scanning direction is referred to as "main scanning position G0". A region adjacent to the main scanning position G0 is a main scanning position G1. Similarly, the photosensitive drum 105 has main scanning positions G2, G3, G4, G5, G6, and GMAX along the main scanning direction. The main scanning position GMAX corresponds to a region extending from the other end portion of the photosensitive drum 105 by a predetermined length in the main scanning direction.

Figure 5:
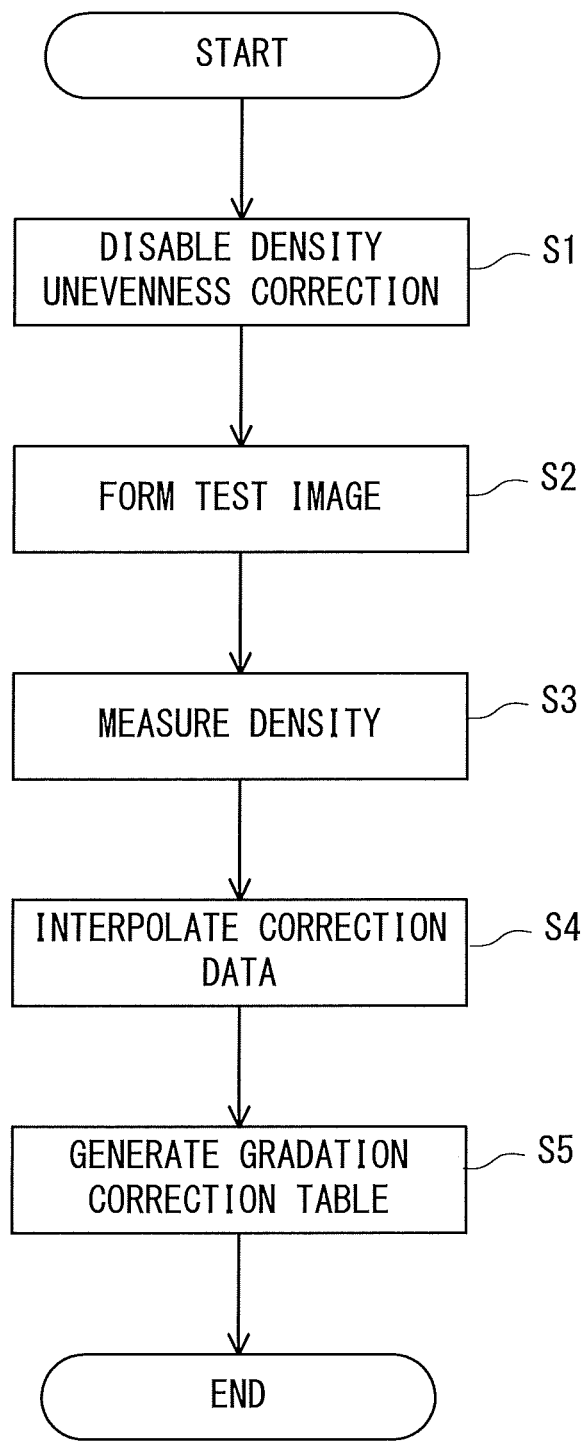
FIG. 5 is a flow chart for illustrating processing of generating a gradation correction table.

FIG. 5 is a flow chart for illustrating the processing of generating the gradation correction table corresponding to each main scanning position. The control unit 11 disables density unevenness correction processing (Step S1). The control unit 11 controls the image forming portion 5 to form a test image (Step S2). The image signal (test image signal) of the test image is stored in advance in the storage unit 12 or the image memory 14. The control unit 11 reads out the image signal of the test image, and inputs the image signal of the test image to the image forming portion 5 via the image processing unit 15. The image forming portion 5 forms the test image based on the test image signal.

Figure 6A:
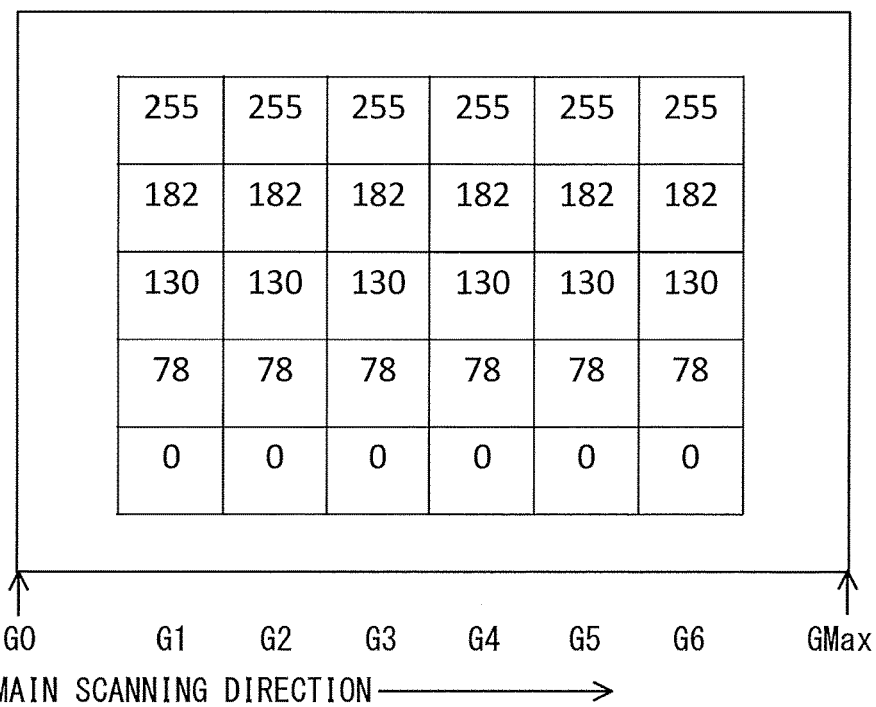
FIG. 6A and FIG. 6B are exemplary diagrams of a test image.
Figure 6B:
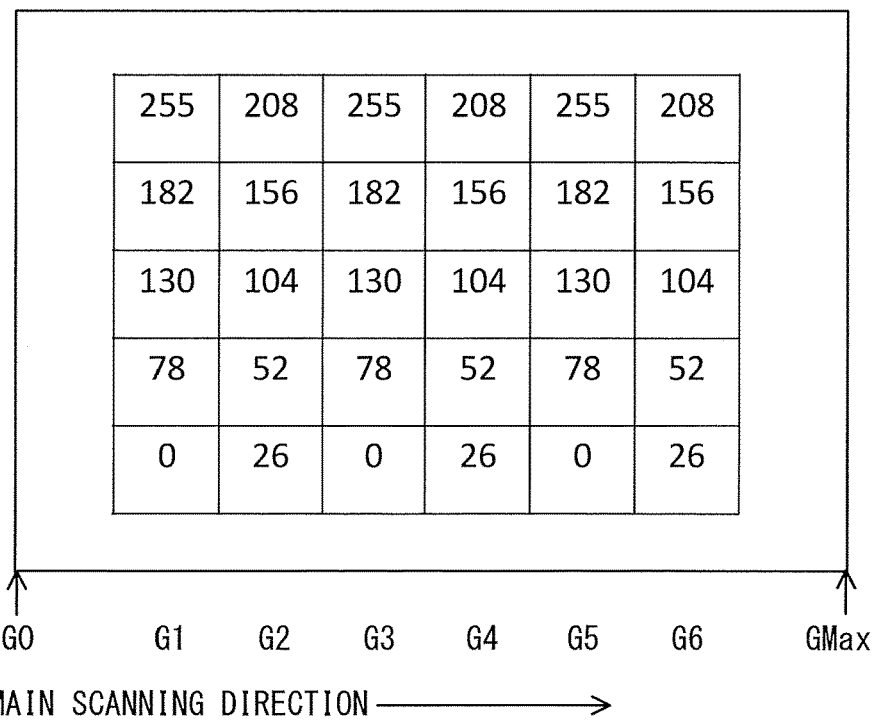

FIG. 6A and FIG. 6B are exemplary diagrams of the test image. FIG. 6A is an illustration of the test image in the related art, and FIG. 6B is an illustration of the test image in the first embodiment. The test image is formed of a plurality of test images whose densities Lk (k=0, 1, 2, 3, 4, 5, 6, 7, 8, and 9) are changed stepwise in a predetermined direction, which is the main scanning direction in this case. In FIG. 6A and FIG. 6B, an image signal value representing the density of each pixel is shown. That is, the image signal value Lk is shown in the test image having the density of Lk. In this example, the density ranges from a minimum value of 0 to a maximum value of 255. The image signal value Lk of the test image is set to any one of L0=0, L1=26, L2=52, L3=78, L4=104, L5=130, L6=156, L7=182, L8=208, and L9=255. Therefore, the test image includes test images having image signal values Lk for 10 gradation levels.

The test images are arranged at positions serving as sampling points as illustrated in FIG. 6A and FIG. 6B. The sampling points are arranged side by side in the main scanning direction. The positions of the sampling points in the main scanning direction are represented by main scanning positions X (X=G1, G2, G3, G4, G5, and G6). Positions of end portions of the image in the main scanning direction are represented by X=G0 and GMax, respectively. The accuracy of detecting the test image is decreased as the size of the test image is decreased. Therefore, the number of test images that can be formed in one test image is limited. In the first embodiment, one test image has six sections in the main scanning direction and five sections in the sub-scanning direction so that a total of thirty test images are formed. The test image in the related art is formed so that all of the test images in the main scanning direction have the same density. In contrast, the test image in the first embodiment is formed so that the test images in the main scanning direction have the same density alternately.

The control unit 11 controls the density sensor 117 to measure the density of the test image formed on the intermediate transfer belt 106 (Step S3). The density sensor 117 inputs the result of measurement to the control unit 11. The control unit 11 performs calculation of converting the acquired result of measurement into color density. The control unit 11 handles this calculated value as a detected density value. The control unit 11 uses the result of detection of the density value of the test image to interpolate correction data (interpolation data) for generating the gradation correction table corresponding to a main scanning position X at which the test image is not actually formed (Step S4).

Figure 7:
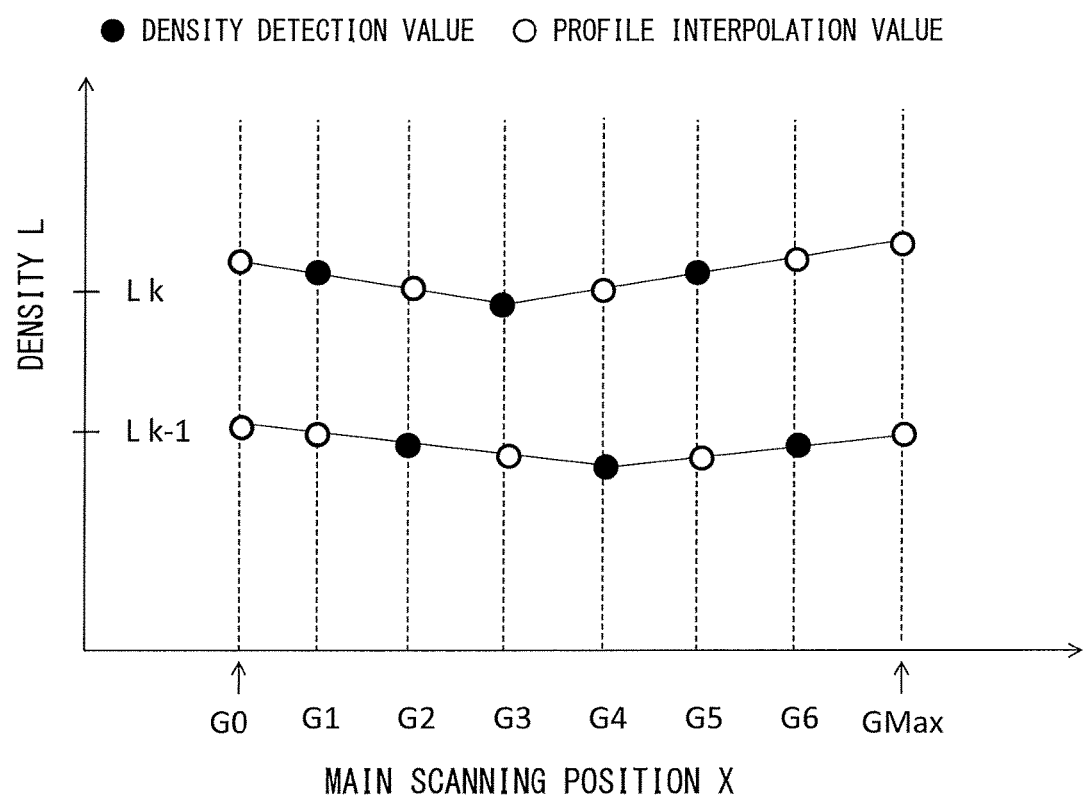
FIG. 7 is an explanatory graph of interpolation of correction data.

FIG. 7 is an explanatory graph of the interpolation of the correction data for generating the gradation correction table corresponding to the main scanning position X. In FIG. 7, the black circle indicates an actually measured value of the test image, and the white circle indicates an interpolation value from the unevenness of a density profile in the main scanning direction. The interpolation processing is performed by, for example, linear interpolation using a known density value of a near test image, but other interpolation processing methods may be employed. The main scanning positions of the test image are a total of six positions of X=G1, G2, G3, G4, G5, and G6. The control unit 11 performs the interpolation processing to generate correction data for the addresses of all of the main scanning positions from the one end portion to the other end portion of the photosensitive drum 105.

In general, the change in density unevenness in the main scanning direction is smaller than the change in gradation characteristic. The gradation characteristic abruptly changes due to the usage environment and the temporal change of the image forming apparatus 100, temporal reduction in performance of the components, and other reasons. Therefore, it is difficult to obtain the density characteristic with respect to the input image signal value I at high accuracy from the result of detection of little gradation. The density unevenness in the main scanning direction does not abruptly change because the density unevenness in the main scanning direction is caused by, for example, unevenness of the laser light amount, the sensitivity of the photosensitive drum 105, and the charging unevenness. Therefore, the density unevenness in the main scanning direction can be obtained through interpolation from the results of measurement at a plurality of positions even without measurement of all of the positions in the main scanning direction. In the first embodiment, with use of the difference between the above-mentioned gradation characteristic and the characteristic of the density unevenness in the main scanning direction, the gradation correction table is generated for each main scanning position at high accuracy while the number of test images is suppressed.

FIG. 8 is an explanatory diagram of the correction data obtained from the test images of FIG. 6A and FIG. 6B. In FIG. 8, the black circle indicates an actually measured value of the test image. The white circle indicates correction data interpolated in the processing of Step S4. When test images having the same image signal value are formed for each main scanning position in order to generate the gradation correction table corresponding to each main scanning position, in the related art, for example, test images of five gradation levels have been formed. This is because the density of the test image includes an error of density unevenness in the main scanning direction. When the test image is formed for each main scanning position, the gradation characteristic can be corrected to an ideal gradation characteristic at high accuracy even if density unevenness occurs. However, in the above-mentioned configuration, a plurality of test images are required to be formed in order to correct the gradation characteristic in a wide range from a low density to a high density in the sub-scanning direction. In the test image in the first embodiment, the density unevenness in the main scanning direction is predicted from the result of measurement of the test image formed in an adjacent region, and hence the number of test images that can be formed in a predetermined region in the sub-scanning direction can be increased. In the above-mentioned configuration, the number of test images that can be formed in the predetermined region is 5, but in the configuration of the first embodiment, the number of test images that can be formed in the predetermined region is 10.

Figure 9:
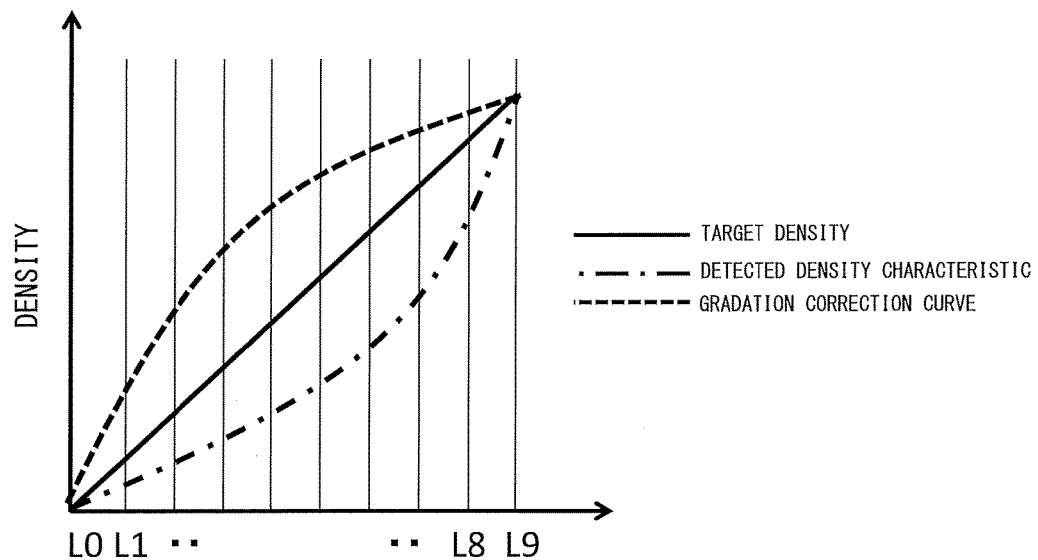
FIG. 9 is an explanatory graph of a method of generating the gradation correction table.

Referring back to FIG. 5, when the interpolation processing is ended, the γ correction unit 255 of the image processing unit 15 generates a gradation correction table for each main scanning position X (Step S5). FIG. 9 is an explanatory graph of a method of generating the gradation correction table. In FIG. 9, an approximate curve of the density detected from the test image is indicated by the alternate long and short dash line. The approximate curve represents the density characteristic of the test image (toner image) detected at the main scanning position X. The solid line indicates the density characteristic corresponding to a target value. The broken line is a curve that is line symmetric to the approximate curve detected from the test image with respect to the density characteristic corresponding to the target value. The broken line is a gradation correction curve, and corresponds to the gradation correction table. The γ correction unit 255 repeatedly performs the processing of obtaining the gradation correction table for each main scanning position X.

The density characteristic corresponding to the target value, which is indicated by the solid line, is a straight line having a slope of "1" so that the input image signal value I is equal to the value of the density of the output image. That is, the density characteristic corresponding to the target value represents a density characteristic in which, when the image signal value of the image is Ln, the density detected from the toner image formed by the image signal value is also Ln.

Figure 10:
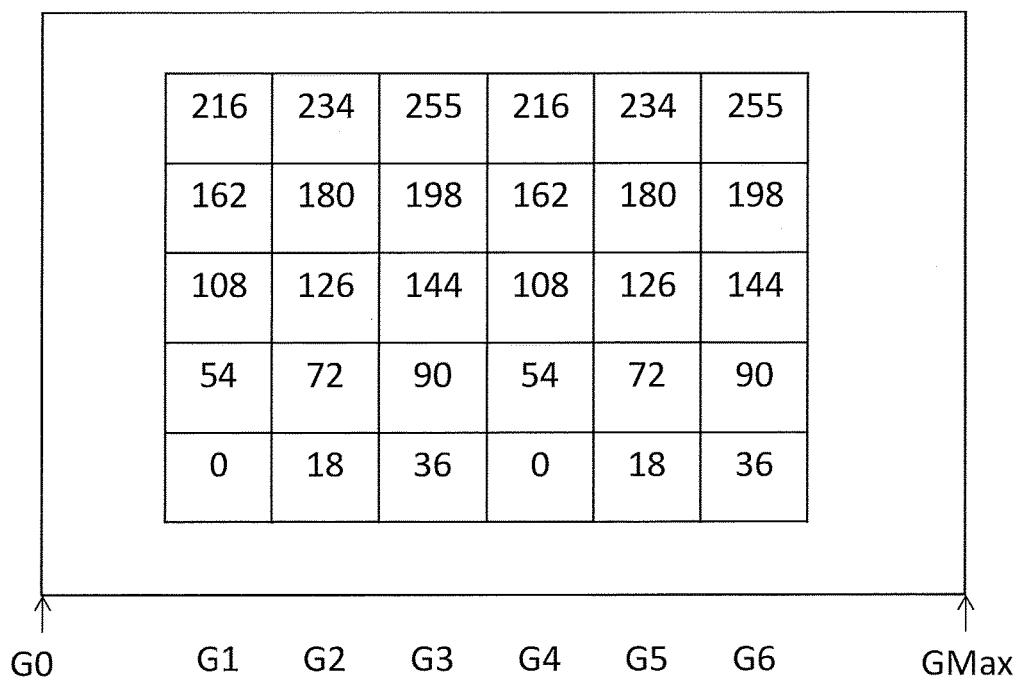
FIG. 10 is an exemplary diagram of a different test image.

In the above-mentioned example, the test image has a configuration in which, as illustrated in FIG. 6B, the test images having the same density are alternately arranged in the main scanning direction. The test image is only required to have a configuration in which a plurality of test images having the same density are present in the main scanning direction. FIG. 10 is an exemplary diagram of a different test image. In this test image, test images having the same density are arranged in every third image in the main scanning direction.

The image forming apparatus 100 of the first embodiment configured as described above can increase the number of gradation levels of the correction data when the gradation correction table is generated for each main scanning position. For example, in the test image in the related art of FIG. 6A, the number of gradation levels is "5". In contrast, in the test image in the first embodiment of FIG. 6B, the number of gradation levels is "10". In the test image in the different example of the first embodiment of FIG. 10, the number of gradation levels is "15". As a result, the gradation correction table can be generated at high accuracy with a small number of test images.

Further, the density unevenness correction in the main scanning direction and the density gradation correction can be performed using one test image, and hence a burden of the user can be reduced as compared to the case in which the density unevenness correction and the density gradation correction are separately performed. As compared to the case in which the measuring image for generating the gradation correction table is dividedly printed on a plurality of sheets, reduction in accuracy of the printing conditions of the image forming apparatus when the measuring image is printed can be prevented.

Second Embodiment

In the first embodiment, the correction data of the gradation correction table is generated by using, for interpolation, the results of measurement of test images having the same density in the main scanning direction. Therefore, a plurality of test images having the same density are required to be formed in the main scanning direction. In a second embodiment of the present invention, a plurality of test images having the same density in the main scanning direction are not formed. In the second embodiment, a result of measurement of a test image having a close density is used to generate the correction data for generating the gradation correction table for each main scanning position from the result of measurement of the density of one test image. The configuration of the image forming apparatus in the second embodiment is similar to that in the first embodiment, and hence the description of the configuration is omitted.

Figures 11, 12:
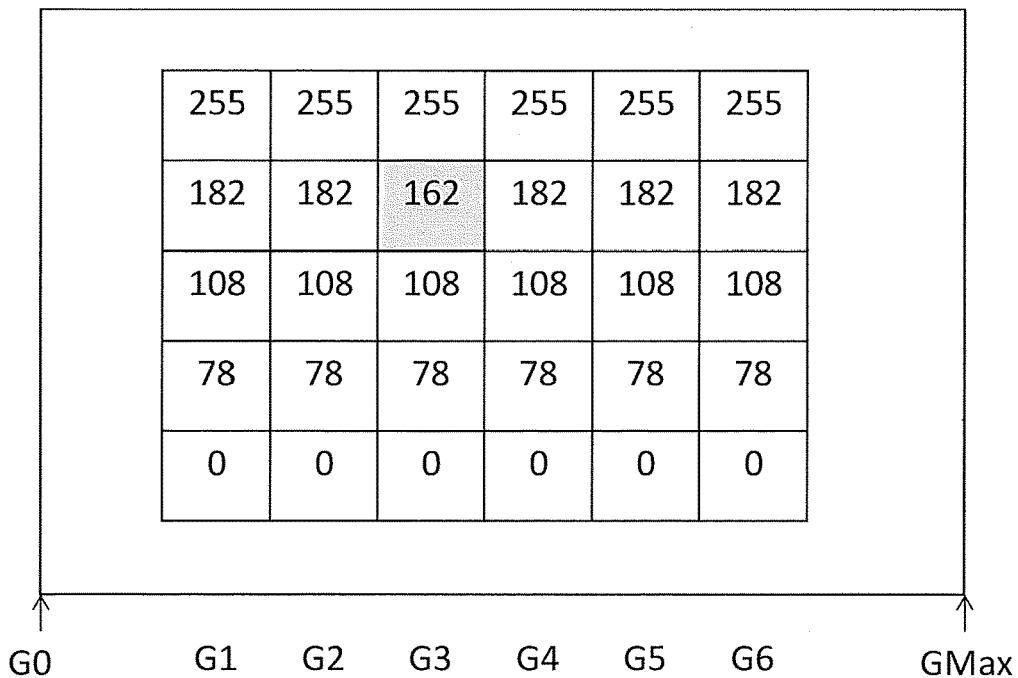
FIG. 11 is an exemplary diagram of a different test image.
FIG. 12 is an explanatory diagram of the correction data.
Figure 13:
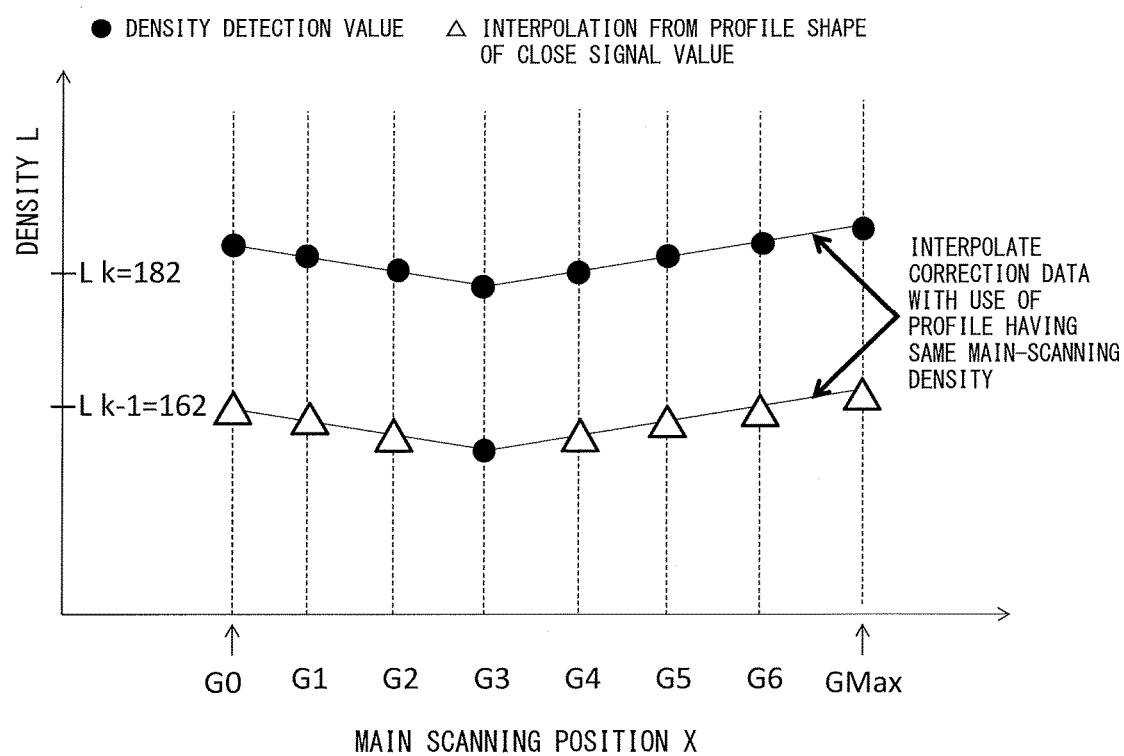
FIG. 13 is an explanatory graph of interpolation of the correction data.

FIG. 11 is an exemplary diagram of a test image that is a measuring image for generating the correction data in the second embodiment. In this test image, one test image having a different density in the main scanning direction is formed. FIG. 12 is an explanatory diagram of the correction data obtained from the test image of FIG. 11. In FIG. 11, the black circle indicates an actually measured value of the test image. The white circle indicates an interpolation value from the unevenness of a density profile in the main scanning direction. The triangle indicates the correction value from the unevenness of a density profile in the main scanning direction. FIG. 13 is an explanatory graph of interpolation of correction data for generating the gradation correction table in the main scanning direction.

In the second embodiment, as illustrated in FIG. 12, the correction data having the image signal value of Lk-1=162 is interpolated using the density profile in the main scanning direction of the image signal value Lk=182. That is, the density value of each position in the main scanning direction (G1, G2, G4, G5, or G6) of the image signal value Lk-1=162 is interpolated based on the measured density (actually measured value at the main scanning position G3 of the image signal value Lk-1) and on the density profile.

In the image forming apparatus of the second embodiment configured as described above, even when a plurality of test images having the same density in the main scanning direction are not formed, the correction data for generating a gradation table for each main scanning position can be generated. That is, in the test image that is the measuring image for generating the image forming condition like the gradation correction table, it is only required that at least one of the plurality of test images arranged in the main scanning direction be formed to have a different density.

Third Embodiment

The plurality of test images described in the first embodiment have a configuration in which the test images having the same density are arranged alternately in the main scanning direction. That is, the plurality of test images described in the first embodiment have different image signal values for forming test images adjacent to each other in the main scanning direction. Therefore, in the plurality of test images described in the first embodiment, the test images adjacent to each other in the main scanning direction have different densities. The image forming apparatus described in a third embodiment of the present invention is configured to form a part of the test images that are adjacent to each other in the main scanning direction based on the same image signal value. Therefore, the test image described in the third embodiment includes test images that are adjacent to each other in the main scanning direction and have different densities, and test images that are adjacent to each other in the main scanning direction and have the same density.

The configuration of the image forming apparatus of the third embodiment is similar to that of the first embodiment, and hence the description of the configuration is omitted. Further, in the following description, the main scanning positions G0 to GMAX are referred to as regions G0 to GMAX, respectively. In this case, one region is divided into a plurality of main scanning positions X. Therefore, the γ correction unit 255 converts the image data based on the gradation correction table for each main scanning position.

Further, the test image described in the third embodiment is formed on the sheet, and is read by the image reading portion 2. That is, the control unit 11 in the third embodiment controls the image reading portion 2 to acquire reading data of a plurality of test images formed on the sheet, and generates the gradation correction table corresponding to the main scanning position based on the acquired reading data.

Figure 14:
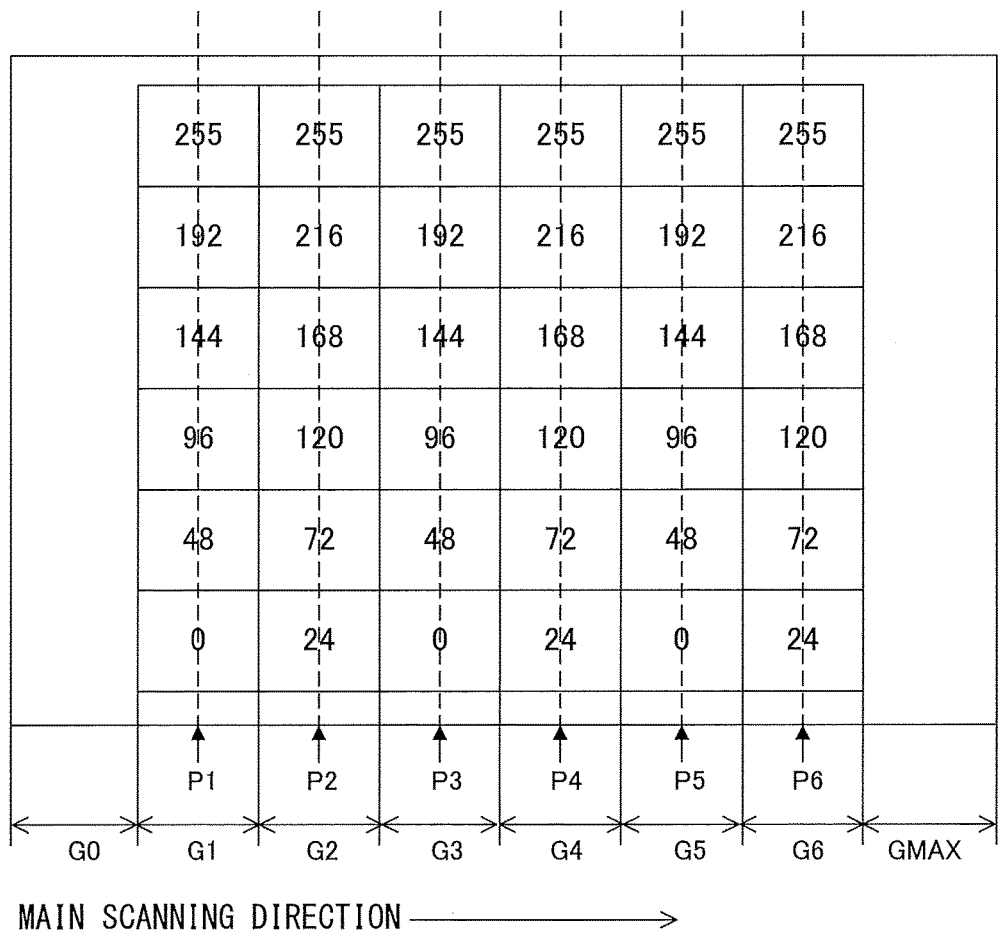
FIG. 14 is an exemplary diagram of a different test image.

FIG. 14 is an exemplary diagram of a sheet on which a plurality of test images are formed. The plurality of test images illustrated in FIG. 14 have eleven gradation levels. The plurality of test images are formed based on image signal values of "0", "24", "48", "72", "96", "120", "144", "168", "192", "216", and "255". In the plurality of test images illustrated in FIG. 14, the image signal values for forming the test images are shown. The density of the test image formed based on the image signal value of "255" is darker than the density of the test image formed based on the image signal value of "0".

As illustrated in FIG. 14, in the regions G1, G3, and G5 on the sheet, a plurality of test images are formed based on the image signal values of "0", "48", "96", "144", "192", and "255". As illustrated in FIG. 14, in the regions G2, G4, and G6 on the sheet, a plurality of test images are formed based on the image signal values of "24", "72", "120", "168", "216", and "255". On the sheet output from the image forming apparatus 100, a plurality of test images having the same density are formed in the main scanning direction.

Main scanning positions P1, P2, P3, P4, P5, and P6 illustrated in FIG. 14 correspond to sampling points for measuring the test images. The broken line connecting between the centers of the plurality of test images formed in the region G1 is an imaginary line connecting between the sampling points of the plurality of test images formed in the region G1. The imaginary line matches the main scanning position P1. There are also sampling points of the regions G0 and GMAX, but those sampling points are omitted from FIG. 14.

Further, when the size of the test image is decreased, the detection accuracy of the test image is decreased. Therefore, the number of test images that can be formed on one sheet is limited. The number of test images formed on one sheet by the image forming apparatus 100 described in the third embodiment is 36. In the test images formed on one sheet, which are described in the third embodiment, the test images adjacent to each other in the main scanning direction are formed based on different image signal values.

As illustrated in FIG. 14, positions at which the test image having the image signal value of "255" is formed in one sheet are different positions in the main scanning direction and overlapping positions in the sub-scanning direction. The test image having the image signal value of "255" is used to enable the user to visually recognize the density unevenness in the main scanning direction. Further, the test image having the image signal value of "255" is also used to generate the gradation correction table.

The plurality of test images illustrated in FIG. 14 are formed by, for example, the image forming portion 123 for black. Therefore, the color of the plurality of test images illustrated in FIG. 14 is black. Reading data (measurement data) of the plurality of test images illustrated in FIG. 14 is used to generate the gradation correction table for black. For example, the image forming apparatus 100 of the third embodiment forms the test images on four sheets in the processing of generating the gradation correction table.

The control unit 11 generates correction data (interpolation data) for generating the gradation correction table corresponding to a main scanning position X at which the test image is not actually formed using the result of detection of the density value of the test image, similarly to the processing described in the first embodiment. Now, the processing of generating the gradation correction table corresponding to the main scanning position P4 is described. In the following description, a test image that is based on the image signal value of "72" is referred to as "first test image", a test image having the image signal value of "168" is referred to as "second test image", a test image having the image signal value of "48" is referred to as "third test image", and a test image having the image signal value of "144" is referred to as "fourth test image".

The control unit 11 uses the measurement data (density) of the third test image formed in the region G3 and the measurement data (density) of the third test image formed in the region G5 for interpolation calculation to obtain interpolation data (density) of the third test image (image signal value of "48") in the region G4. Next, the control unit 11 uses the measurement data (density) of the fourth test image formed in the region G3 and the measurement data (density) of the fourth test image formed in the region G5 for interpolation calculation to obtain interpolation data (density) of the fourth test image (image signal value of "144") in the region G4. Then, the control unit 11 generates a gradation correction table corresponding to the main scanning position P4 based on the measurement data of the first test image formed in the region G4, the measurement data of the second test image formed in the region G4, the interpolation data of the third test image in the region G4, and the interpolation data of the fourth test image in the region G4.

Next, the processing of generating the gradation correction table corresponding to the main scanning position P5 is also described. The control unit 11 uses the measurement data (density) of the first test image formed in the region G4 and the measurement data (density) of the first test image formed in the region G6 for interpolation calculation to obtain interpolation data (density) of the first test image (image signal value of "72") in the region G5. Next, the control unit 11 uses the measurement data (density) of the second test image formed in the region G4 and the measurement data (density) of the second test image formed in the region G6 for interpolation calculation to obtain interpolation data (density) of the second test image (image signal value of "168") in the region G5. Then, the control unit 11 generates a gradation correction table corresponding to the main scanning position P5 based on the measurement data of the third test image formed in the region G5, the measurement data of the fourth test image formed in the region G5, the interpolation data of the first test image in the region G5, and the interpolation data of the second test image in the region G5.

The control unit 11 may determine the gradation correction table corresponding to a freely-selected main scanning position between the main scanning position P4 and the main scanning position P5 based on the measurement data of the plurality of test images formed in the region G4 and on the measurement data of the plurality of test images formed in the region G5. For example, the control unit 11 obtains the interpolation data of the first test image corresponding to the freely-selected main scanning position between the main scanning position P4 and the main scanning position P5 through interpolation calculation of the measurement data of the first test image formed in the region G4 and the interpolation data of the first test image in the region G5. Similarly, the control unit 11 obtains the interpolation data of the plurality of test images of a freely-selected main scanning position, and generates the gradation correction table corresponding to the freely-selected main scanning position based on the interpolation data.

Figure 15:
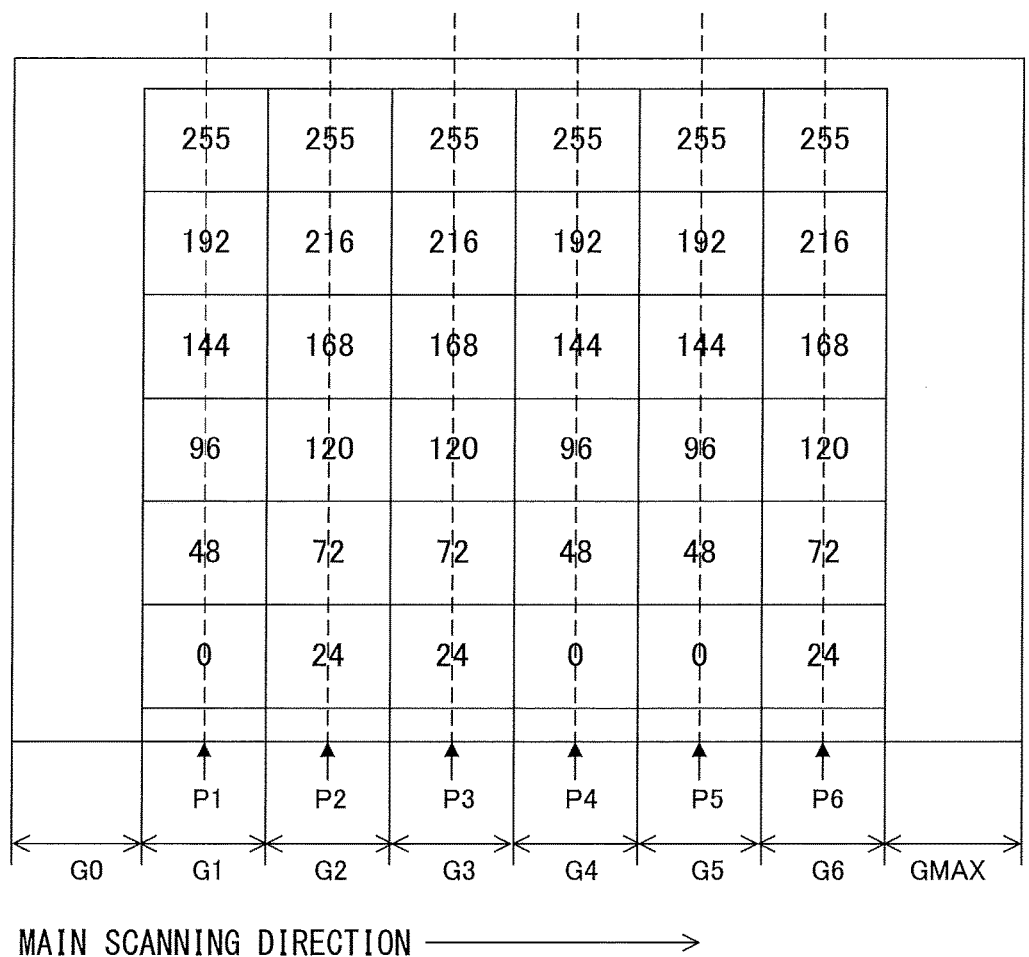
FIG. 15 is an exemplary diagram of a different test image.

Further, FIG. 15 is an exemplary diagram of a different sheet on which a plurality of test images are formed. The plurality of test images illustrated in FIG. 15 have eleven gradation levels. The plurality of test images are formed based on image signal values of "0", "24", "48", "72", "96", "120", "144", "168", "192", "216", and "255". In the plurality of test images illustrated in FIG. 15, the image signal values for forming the test images are shown.

As illustrated in FIG. 15, in the regions G1, G4, and G5 on the sheet, a plurality of test images are formed based on the image signal values of "0", "48", "96", "144", "192", and "255". As illustrated in FIG. 15, in the regions G2, G3, and G6 on the sheet, a plurality of test images are formed based on the image signal values of "24", "72", "120", "168", "216", and "255". On the sheet output from the image forming apparatus 100, a plurality of test images having the same density are formed in the main scanning direction.

The control unit 11 uses the result of detection of the density value of the test image to generate the correction data (interpolation data) for generating the gradation correction table corresponding to the main scanning position X at which the test image is not actually formed. For example, the control unit 11 uses the density of the test images having the image signal value of "96", which are formed at the main scanning position P1 and the main scanning position P4, for interpolation calculation to obtain the interpolation data of the test image having the image signal value of "96" at the main scanning position P2. Then, the control unit 11 generates the gradation correction table corresponding to the main scanning position P2 based on the actually measured values of the plurality of test images formed at the main scanning position P2 and on the interpolation data of the test image having the image signal value of "96" at the main scanning position P2.

Further, the control unit 11 uses the density of the test images having the image signal value of "96", which are formed at the main scanning position P1 and the main scanning position P4, for interpolation calculation to obtain the interpolation data of the test image having the image signal value of "96" at the main scanning position P3. Then, the control unit 11 generates the gradation correction table corresponding to the main scanning position P3 based on the actually measured values of the plurality of test images formed at the main scanning position P3 and on the interpolation data of the test image having the image signal value of "96" at the main scanning position P3.

The image forming apparatus 100 of the third embodiment configured as described above can increase the number of gradation levels of the correction data when the gradation correction table is generated for each main scanning position. As a result, according to the image forming apparatus of the third embodiment, the test images that are based on different image signal values in the main scanning direction can be formed so that the gradation correction table corresponding to the main scanning position can be generated at high accuracy.

Further, the density unevenness correction in the main scanning direction and the density gradation correction can be performed using one test image, and hence a burden of the user can be reduced as compared to the case in which the density unevenness correction and the density gradation correction are separately performed. As compared to the case in which the measuring image for generating the gradation correction table is dividedly printed on a plurality of sheets, reduction in accuracy of the printing conditions of the image forming apparatus when the measuring image is printed can be prevented.

Further, the image forming apparatus 100 of each of the first, second, and third embodiments forms the plurality of test images on one sheet using only toner of a predetermined color. However, for example, the image forming apparatus 100 may form the test images on one sheet using toner of two or more colors. For example, the image forming apparatus 100 forms a yellow test image group, a magenta test image group, a cyan test image group, and a black test image group on one sheet 110. The control unit 11 generates the gradation correction table for yellow based on the reading data (measurement data) of the yellow test image group, and generates the gradation correction table for magenta based on the reading data (measurement data) of the magenta test image group. Similarly, the control unit 11 generates the gradation correction table for cyan based on the reading data (measurement data) of the cyan test image group, and generates the gradation correction table for black based on the reading data (measurement data) of the black test image group.

As described above, according to the first, second, and third embodiments of the present invention, the gradation correction table can be generated at high accuracy while the user's convenience is maintained.

The present invention is not limited to the above-mentioned embodiments, and various modifications can be made thereto. For example, in the above-mentioned embodiments, the CPU of the printer controller 10 reads out a program from the storage unit 12, loads the program onto the RAM, and executes the program. However, as needed, the program may be received from an external apparatus or an external storage medium and loaded onto the RAM.

Further, the above-mentioned first, second, and third embodiments are given just for the purpose of describing the present invention more specifically, and the scope of the present invention is not limited by the embodiments. The present invention encompasses various modes that conform to the spirit of the present invention. For example, parts of the embodiments described above may be combined as appropriate.

The control of the various types of processing described in the embodiments can be operated by installing a processing control program (computer program) into a computer. Further, needless to say, a storage medium having stored thereon a processing control program so as to be executable in a computer is also encompassed in the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Embodiment (s) of the present invention can also be realized by a computer of a system or apparatus that includes one or more circuits (e.g., application specific integrated circuit (ASIC) or SOC (system on a chip)) for performing the functions of one or more of the above-described embodiment (s). The computer may comprise one or more processors (e.g., central processing unit (CPU), micro processing unit (MPU)) and may include a network of separate computers or separate processors to read out and execute the computer executable instructions.

This application claims the benefit of Japanese Patent Application No. 2017-062687, filed Mar. 28, 2017 and Japanese Patent Application No. 2018-041733, filed Mar. 8, 2018 which are hereby incorporated by reference herein in their entirety.

What is claimed is:

1. An image forming apparatus, comprising:
a photosensitive receiver configured to rotate;
an image processor configured to convert image data based on a plurality of conversion conditions corresponding to a plurality of positions in a predetermined direction orthogonal to a rotation direction of the photosensitive receiver; and
an image former configured to expose the photosensitive receiver with light based on the image data converted by the image processor to form an electrostatic latent image on the photosensitive receiver, and develop the electrostatic latent image on the photosensitive receiver;
a controller configured to:
control the image former to form a first test image and a second test image in a first region including a first position among the plurality of positions;
control the image former to form a third test image and a fourth test image in a second region including a second position among the plurality of positions, the second region being different from the first region in the predetermined direction;
control the image former to form a different first test image and a different second test image in a third region including a third position among the plurality of positions, the third region being different from the first region and the second region in the predetermined direction;
control the photosensitive member, the exposing unit, and the developing unit to form a different third test image and a different fourth test image in a fourth region including a fourth position among the plurality of positions, the fourth region being different from the first region, the second region, and the third region in the predetermined direction;
acquire measurement data related to a plurality of test images, wherein the measurement data is output from a sensor, wherein the plurality of test images include the first test image, the second test image, the third test image, the fourth test image, the different first test image, the different second test image, the different third test image, and the different fourth test image; and
generate the plurality of conversion conditions based on the measurement data,
wherein the third test image, the different third test image, the fourth test image, and the different fourth test image are prevented from being formed in the first region,
wherein the first test image, the different first test image, the second test image, and the different second test image are prevented from being formed in the second region,
wherein the third test image, the different third test image, the fourth test image, and the different fourth test image are prevented from being formed in the third region, and
wherein the first test image, the different first test image, the second test image, and the different second test image are prevented from being formed in the fourth region.

2. The image forming apparatus according to claim 1, wherein a range in which the first test image is formed in the first region and a range in which the different first test image is formed in the third region overlap with each other in the rotation direction, and
wherein a range in which the second test image is formed in the first region and a range in which the different second test image is formed in the third region overlap with each other in the rotation direction.

3. The image forming apparatus according to claim 2, wherein a range in which the third test image is formed in the second region and a range in which the different third test image is formed in the fourth region overlap with each other in the rotation direction, and
wherein a range in which the fourth test image is formed in the second region and a range in which the different fourth test image is formed in the fourth region overlap with each other in the rotation direction.

4. The image forming apparatus according to claim 3, wherein the range in which the first test image is formed in the first region and a range in which the third test image is formed in the second region overlap with each other in the rotation direction, and
wherein the range in which the second test image is formed in the first region and a range in which the fourth test image is formed in the second region overlap with each other in the rotation direction.

5. The image forming apparatus according to claim 1, wherein the controller is configured to form the first test image based on a first image signal value and form the different first test image based on the first image signal value, wherein the controller is configured to form the second test image based on a second image signal value and form the different second test image based on the second image signal value, wherein the controller is configured to form the third test image based on a third image signal value and form the different third test image based on the third image signal value, wherein the controller is configured to form the fourth test image based on a fourth image signal value and form the different fourth test image based on the fourth image signal value, wherein the first image signal value differs from the second image signal value, wherein the second image signal value differs from the third image signal value, wherein the third image signal value differs from the fourth image signal value, wherein the fourth image signal value differs from the first image signal value, wherein the first image signal value differs from the third image signal value, and wherein the second image signal value differs from the fourth image signal value.

6. The image forming apparatus according to claim 1, wherein the first position is located between the second position and the fourth position in the predetermined direction, and wherein the second position is located between the first position and the third position in the predetermined direction.

7. The image forming apparatus according to claim 1, wherein the controller is configured to generate a first conversion condition corresponding to the first position based on first measurement data related to the first test image, second measurement data related to the second test image, third measurement data related to the third test image, different third measurement data related to the different third test image, fourth measurement data related to the fourth test image, and different fourth measurement data related to the different fourth test image.

8. The image forming apparatus according to claim 7, wherein the controller is configured to:
determine first interpolation data based on the third measurement data and the different third measurement data;
determine second interpolation data based on the fourth measurement data and the different fourth measurement data; and
generate the first conversion condition based on the first measurement data, the second measurement data, the first interpolation data, and the second interpolation data.

9. The image forming apparatus according to claim 1, wherein the image former is configured to develop the electrostatic latent image using toner of a predetermined color, wherein the first test image, the second test image, the third test image, and the fourth test image are formed using the toner of the predetermined color, and wherein the different first test image, the different second test image, the different third test image, and the different fourth test image are formed using the toner of the predetermined color.

10. The image forming apparatus according to claim 1, further comprising a transfer configured to transfer the image formed on the photosensitive receiver onto a sheet, wherein the sensor is configured to measure the plurality of test images transferred onto the sheet by the transfer.

11. The image forming apparatus according to claim 1, further comprising:
a transfer member onto which the image formed on the photosensitive receiver is to be transferred; and
a transfer configured to transfer the image transferred on the transfer member onto a sheet, wherein the sensor is configured to measure the plurality of test images transferred onto the transfer member.

12. A method of controlling an image forming apparatus, the image forming apparatus including:
a photosensitive receiver configured to rotate;
an image processor configured to convert image data based on a plurality of conversion conditions corresponding to a plurality of positions in a predetermined direction orthogonal to a rotation direction of the photosensitive receiver; and
an image former configured to expose the photosensitive receiver with light based on the converted image data to form an electrostatic latent image on the photosensitive receiver, and develop the electrostatic latent image formed on the photosensitive receiver;
the method comprising:
forming a first test image and a second test image in a first region including a first position among the plurality of positions;
forming a third test image and a fourth test image in a second region including a second position among the plurality of positions, the second region being different from the first region in the predetermined direction;
forming a different first test image and a different second test image in a third region including a third position among the plurality of positions, the third region being different from the first region and the second region in the predetermined direction;
forming a different third test image and a different fourth test image in a fourth region including a fourth position among the plurality of positions, the fourth region being different from the first region, the second region, and the third region in the predetermined direction;
acquiring measurement data related to a plurality of test images, wherein the measurement data is output from a sensor, wherein the plurality of test images include the first test image, the second test image, the third test image, the fourth test image, the different first test image, the different second test image, the different third test image, and the different fourth test image; and
generating the plurality of conversion conditions based on the measurement data, wherein the third test image, the different third test image, the fourth test image, and the different fourth test image are prevented from being formed in the first region, wherein the first test image, the different first test image, the second test image, and the different second test image are prevented from being formed in the second region, wherein the third test image, the different third test image, the fourth test image, and the different fourth test image are prevented from being formed in the third region, and wherein the first test image, the different first test image, the second test image, and the different second test image are prevented from being formed in the fourth region.

13. An image forming apparatus that includes a photosensitive receiver, comprising:
an image processor configured to convert image data based on a plurality of conversion conditions corresponding to a plurality of positions in a predetermined direction orthogonal to a rotation direction of the photosensitive receiver;
an image former configured to expose the photosensitive receiver with light based on the image data converted by the image processor to form an electrostatic latent image, and develop the electrostatic latent image on the photosensitive receiver;
a controller configured to control the image former to form a plurality of test images, acquire measurement data related to the plurality of test images, and generate the plurality of conversion conditions based on the measurement data, wherein the measurement data is output from a sensor;
wherein the plurality of test images includes:
a first test image formed on a first position in the predetermined direction based on a first image signal value;
a second test image formed on a second position, which is different from the first position, in the predetermined direction based on the first image signal value;
a third test image formed on the first position in the predetermined direction based on a second image signal value, a position of the third test image in the rotation direction being different from the position of the first test image in the rotation direction, a fourth test image formed on the second position in the predetermined direction based on the second image signal value, a position of the fourth test image in the rotation direction being different from a position of the second test image in the rotation direction, a fifth test image formed on a third position in the predetermined direction based on a third image signal value, the third position being different from any of the first position and the second position in the predetermined direction;
a sixth test image formed on a fourth position, which is different from the third position in the predetermined direction, based on the third image signal value, the fourth position being different from any of the first position, the second position and the third position in the predetermined direction; and
a seventh test image formed on the third position in the predetermined direction based on a fourth image signal value, a position of the seventh test image in the rotation direction being different from a position of the fifth test image in the rotation direction; and
an eighth test image formed on the fourth position in the predetermined direction based on the fourth image signal value, a position of the eighth test image in the rotation direction being different from a position of the sixth test image in the rotation direction;
wherein the first image signal value, the second image signal value, the third image signal value, and the fourth image signal value differ from each other;
wherein the first test image, the second test image, the third test image, and the fourth test image is not formed at the third position in the predetermined direction and the fourth position in the predetermined direction; and wherein the fifth test image, the sixth test image, the seventh test image, and the eighth test image is not formed at the first position and the second position.

14. The image forming apparatus according to claim 13, wherein the controller generates a conversion condition corresponding to a predetermined position among the plurality of conversion conditions based on a measurement result of the first test image in the measurement data, a measurement result of the third test image in the measurement data, a measurement result of the fifth test image in the measurement data, a measurement result of the sixth test image in the measurement data, a measurement result of the seventh test image in the measurement data, and a measurement result of the eighth test image in the measurement data.

15. The image forming apparatus according to claim 14, the controller generates another conversion condition corresponding to another position other than the predetermined position among the plurality of conversion conditions based on a measurement result of the second test image in the measurement data, a measurement result of the fourth test image in the measurement data, a measurement result of the fifth test image in the measurement data, a measurement result of the sixth test image in the measurement data, a measurement result of the seventh test image in the measurement data, and a measurement result of the eighth test image in the measurement data.

16. The image forming apparatus according to claim 13, wherein the first position is located between the third position and the fourth position in the predetermined direction.

17. The image forming apparatus according to claim 13, wherein the region in which the second test image is formed in the rotation direction overlaps with the region in which the first test image is formed in the rotation direction;
wherein the region in which the fourth test image is formed in the rotation direction overlaps with the region in which the third test image is formed in the rotation direction;
wherein the region in which the sixth test image is formed in the rotation direction overlaps with the region in which the fifth test image is formed in the rotation direction; and
wherein the region in which the eights test image is formed in the rotation direction overlaps with the region in which the seventh test image is formed in the rotation direction.

18. The image forming apparatus according to claim 17, wherein the region in which the fifth test image is formed in the rotation direction overlaps with the region in which the first test image is formed in the rotation direction; and
wherein the region in which the seventh test image is formed in the rotation direction overlaps with the region in which the third test image is formed in the rotation direction.

19. The image forming apparatus according to claim 13, wherein the first test image, the second test image, the third test image, the fourth test image, the fifth test image, the sixth test image, the seventh test image, and the eighth test image are formed on a sheet.

20. The image forming apparatus according to claim 13, wherein the plurality of test images includes:
a ninth test image formed on a fifth position in the predetermined direction based on the first image signal value;

a tenth test image formed on a sixth position in the predetermined direction based on the second image signal value;

an eleventh test image formed on the fifth position in the predetermined direction based on the third image signal value, a position of the eleventh test image in the rotation direction being different from the position of the ninth test image in the rotation direction, a twelfth test image formed on the sixth position in the predetermined direction based on the fourth image signal value, a position of the twelfth test image in the rotation direction being different from a position of the tenth test image in the rotation direction, the first position, the second position, the third position, the fourth position, the fifth position, and the sixth position differ from each other in the predetermined direction.

* * * * *